July 29, 1941.  A. TAUSCHER  2,250,784
THERMOMETRIC INSTRUMENT
Filed Sept. 27, 1938
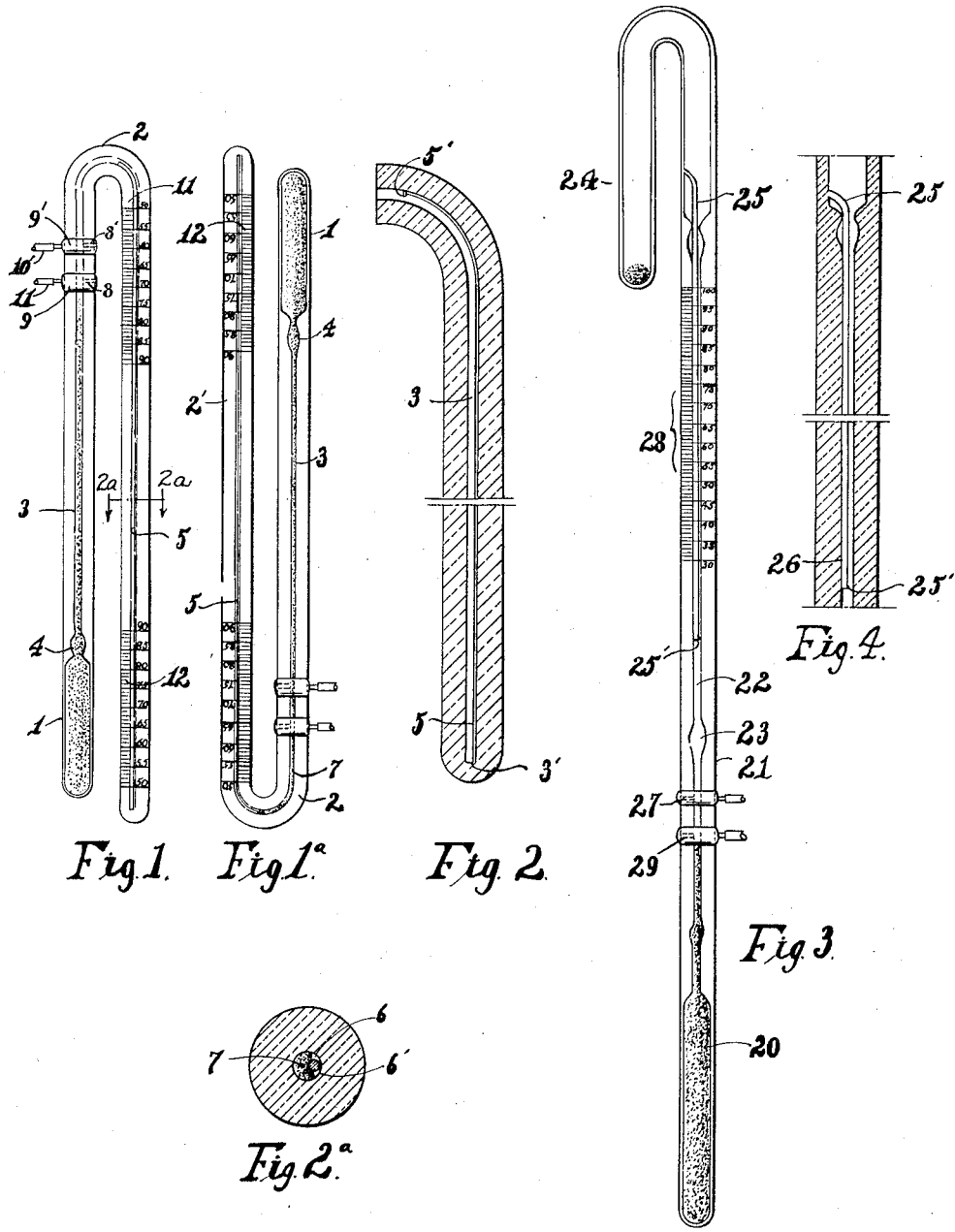
INVENTOR.
Alfred Tauscher
BY
ATTORNEY.

Patented July 29, 1941

2,250,784

UNITED STATES PATENT OFFICE 2,250,784

THERMOMETRIC INSTRUMENT

Alfred Tauscher, Philadelphia, Pa., assignor to Precision Thermometer & Instrument Company, Philadelphia, Pa., a corporation of Pennsylvania Application September 27, 1938, Serial No. 231,967

10 Claims. (Cl. 200—141)

My improvements relate to thermometric instruments having a closed bore containing a liquid body including a capillary column and a fluid differing in surface tension from the body and preferably having a high pressure for maintaining the stability of the liquid column at high temperatures.

My invention provides means and a method for "setting" such instruments by by-passing a portion of the fluid along a liquid column section of variable predeterminable magnitude and separating such section from the body of the liquid and moving it in a direction which would normally be against the pressure of the fluid. Such separation leaves a body of liquid having a volume requisite for effecting the operation of the instruments desired for a given "setting."

The extent or length of the section to be separated is variable by varying the temperature of the liquid body prior to effecting the separation, and the instrument is so graduated that the length of the section to be separated indicates directly upon a scale the condition at which the instrument will be "set" to operate upon separation of such section.

My improvements are particularly applicable to adjustable thermostats of the mercury and glass type, sometimes called "metastatic thermoregulators," and which are adjustable for use at different temperatures within the total range or capacity of the instrument.

In the preferred embodiment of my invention, an instrument, having a closed bore containing a mercury column and gas, is provided with means whereby portions of the mercury and gas may be transposed, and disruption of the mercury column by shock or jolting facilitated, so as to render practicable the accurate removal of a portion of the mercury at a predetermined point; the gas being by-passed from an end of the mercury column to the point of disruption through a passage from which the mercury is excluded by its capillary repulsion and surface tension.

The gas by-pass along the mercury column preferably consists of an acute-angled crevice along the column, which latter has a high surface tension forming a curved surface which is repulsed by the edges of the crevice. The crevice is preferably formed by positioning along the inner wall of the bore a fine rod of glass or other material which is not wetted by mercury. The inner wall of the bore and outer wall of the rod coact to form acute-angled longitudinal grooves or channels too small for the entry of mercury. When the mercury column is subjected to shock, it tends to break adjacent to the free end of the rod where mercury column sections of different thickness come together.

The breaking of the liquid column may be further facilitated by further constricting the instrument bore at the point of egress of the gas by-pass, as for instance by the provision of a small ball or head on the end of the fine rod.

The embodiment of my improvements in metastatic thermoregulators renders such instruments self-setting and self-indicating, and hence completely self-contained. They may be "set" for ordinary use without necessity for accessories heretofore commonly used, such as a standard thermometer of appropriate type, range and scale divisions, and an accurately controlled constant temperature bath, though the latter is convenient for fine adjustment of instruments embodying my invention. They may also be calibrated to show the temperature at which they are set to operate. The internal gas pressure required to stabilize a mercury column, or similar column, in instruments intended for use at high temperatures have heretofore interfered with the desired setting of the instrument. My invention overcomes the difficulties incident to the setting of instruments having pure dry hydrogen gas under high pressure above the mercury column since the gas by-pass permits the passage of gas past the mercury column for a desired distance, and permits the free flow of a detached thread of mercury in the direction which would otherwise be against the gas pressure. By the manipulation of my improved instrument, a transposition of gas and mercury is readily secured, since the gas pressure is equalized along the entire length of the mercury thread to be detached from the main column and, upon tapping or jolting the instrument, a break in the mercury will occur at the point where the gas by-pass terminates.

By expanding the mercury so that its meniscus passes predetermined distances beyond the predetermined point of breakage and then separating the column at such point of breakage, the volume of mercury left in the main column and in the bulb may be so adjusted that the meniscus of the column will contact a control electrode and close a circuit at a selected temperature. If desired, the detached thread may be utilized to indicate the selected temperature for which the instrument has been set.

The distances or setting factors necessary to effect circuit closing at desired temperatures may be etched on the tube as a scale extending along the gas by-pass, and such scale may be so marked as to give a direct reading of the temperature at which the mercury column will contact the control electrode.

The scale by which the detached thread may be used to indicate the "setting" of the instrument may be also etched on the tube. Since this detached thread contains only a minute volume of mercury, the variations in its length with changes in atmospheric temperature will be substantially nil, hence it can be relied upon as indicating the approximate setting of the instrument, regardless of the position of the meniscus of the main or operating column.

The characteristic features and advantages of my invention will further appear from the following description and the accompanying drawing in illustration thereof.

In the drawing, Fig. 1 illustrates the embodiment of my invention in an inverted U-type of thermoregulator; Fig. 1a is an elevation of the instrument of Fig. 1 in inverted position; Fig. 2 is an enlarged fragmentary sectional view of a leg of the thermoregulator of Fig. 1; Fig. 2a is a transverse sectional view of the thermoregulator of Fig. 1 on a greatly enlarged scale; Fig. 3 is an elevation of a further form of thermoregulator embodying my invention; and Fig. 4 is an enlarged fragmentary view showing the gas by-pass section of the tube of Fig. 3.

As illustrated in Figs. 1 to 2a, inclusive, my improvements are embodied in an inverted U-type of mercury-in-glass or gallium-in-quartz thermoregulator having a hollow bulb 1 and a bent U-tube 2 containing a fine capillary bore 3 communicating with the top of the bulb and preferably containing a contracting chamber 4.

A fine cylindrical glass rod 5 is fixed to the end 3' of the bore 3 and extends through the bore to a point adjacent to the tube bend, where the rod terminates in a head 5'. The rod lies close to the wall along one side of the bore and the intersection of the circumference of the rod with the circumference of the bore results in the formation of acute-angled grooves or crevices 6, 6', extending axially of the bore and forming gas by-passes from which the mercury column 7 is excluded by its surface tension and capillary repulsion. The bore of the instrument contains gas, such as hydrogen, under pressure to maintain desired stability of the mercury column at high temperatures.

A ground electrode 8 and a control electrode 8' are sealed in the glass with their ends exposed in the bore and are connected in circuit through the rings 9 and 9' and conductors 10 and 10'.

Adjusting or setting factors, based on the interval between the electrode 8' and head 5', and the expansion of the mercury at different temperatures, are determined for the individual instruments and etched on the glass as scale 11 extending along the grooves 6, 6'.

A second scale 12 may be provided with its datum adjacent to the end of the bore and so calibrated that the length of a detached thread of mercury will indicate the temperature for which the instrument is set.

To set the instrument, it is inverted and any mercury in the graduated leg 2' allowed to flow toward the bend, the flow being assisted, if necessary, by a sharp jerk or a gentle tapping. When the mercury in the leg 2' has all flowed downward toward the end of the gas by-pass, the inverted bulb is warmed gradually by any convenient means until the column expanding from the bulb unites with the mercury in the leg 2'. The warming of the bulb is continued until the meniscus of the united mercury column has slightly overshot the graduation indicating the temperature at which it is desired to have the thermostatic control operate, such temperatures being shown directly by the empirical graduations of the scale 11.

The instrument is allowed to cool slowly, still in inverted position, until the meniscus retreats to the exact point on the scale indicating the desired operating temperature. By immediately turning the instrument to its normal position, with bulb downward, and, if necessary, giving it a jolt or tap, the column of mercury will separate at the end of the gas by-pass adjacent the head 5', and the detached thread of mercury will flow along the by-pass to the end 3' of the bore, and will indicate on the scale 12 the temperature for which the instrument is set. On further cooling, the remainder of the column will retreat toward the bulb and the meniscus thereof will just reach the electrode 8' and close the circuit at the temperature indicated on the scale 11 by the meniscus of the thread at the moment of breaking.

In Figs. 3 and 4, my invention is shown embodied in a thermoregulator having an auxiliary or overflow chamber of inverted U-form at the top of the main leg.

In the instrument illustrated, the bulb 20 has projecting therefrom a tube 21 containing a fine capillary bore 22 containing a contraction chamber 23. The top of the capillary bore communicates with a gas filled overflow chamber 24 in the upper part of the tube; the overflow chamber being of inverted U-shape.

A rod 25, similar in structure and function to the rod 5, extends from the wall of the overflow chamber downward through the bore 22 to form with the wall thereof acute angled grooves 26. These grooves provide a by-pass for gas under high pressure from the overflow chamber down to the head 25' on the rod which constricts the bore at a point, above the control electrode 27, at which it is desired to break the mercury column to set the instrument.

In setting the instrument, all the mercury in the overflow chamber is thrown into the section thereof above the capillary and flows downward in the latter, the gas from such bore being discharged through the gas by-pass 26 to the overflow chamber. The bulb is then heated to expand the mercury therein until it unites with the mercury in the bore section adjacent to the gas by-pass. Heating is continued until the meniscus of the united column is slightly above the point which has been empirically calibrated on the scale 28 as indicating the point of expansion necessary to secure operation of the instrument at a given selected temperature. The bulb is then allowed to slowly cool until the meniscus recedes to such point, when the instrument is quickly inverted, and, if necessary, tapped or jarred. The mercury thread beyond the head 25' breaks away and slides down into the overflow chamber and is segregated in the outer section thereof. On continued cooling, the remainder of the column connected with the mercury in the bulb continues to recede. At the selected temperature which was indicated by the meniscus of the mercury thread on the scale 28 at the moment of breaking the thread, the main column will just reach from the bulb to the control electrode 27, which is connected in circuit, as is also the ground electrode 29.

To set the instrument to operate at any other selected temperature, the mercury in the overflow chamber is returned to the bore and the main mercury column reunited therewith and the column again broken at the head 25' when the meniscus of the united column is at the point on the scale which has been calibrated to leave a sufficient volume of mercury in the bulb and bore to effect the closure of the circuit by contact of the meniscus of the main column with the control electrode at the selected temperature.

It will thus be seen that by my improvements the volume of thermally sensitive liquid in a thermoregulator may be adjusted by severing a desired and predetermined length of thread of such liquid at a point in the liquid column where it has been weakened or rendered readily frangible, and that separation of the severed thread may be readily effected in a high pressure thermometer by by-passing the gas around the severed thread section to the point of severance.

Having described my invention, I claim:—

1. An instrument having a bore containing a liquid column and gas, and means forming a gas by-pass along a portion only of the bore.

2. An instrument having a bore containing a liquid column and gas, and means forming a gas by-pass along a portion only of the bore, said liquid having a surface tension excluding it from said by-pass.

3. An instrument having a bore containing a liquid column and gas under pressure, and means forming a gas by-pass along a portion only of the bore and including a rod in said bore, said rod forming with the wall of said bore acute angled crevices so narrow that said liquid is excluded therefrom by its surface tension and capillary repulsion.

4. An instrument having a bore containing a liquid column and gas, and means forming a gas by-pass too small for the entry of said liquid along a portion only of said bore and including a rod in said bore having an enlargement constricting said bore at a point where the liquid column is to be broken.

5. An instrument having a bore containing a liquid column and gas and an acute angled groove forming a gas by-pass along a portion only of said bore, said liquid having a capillary repulsion excluding it from said groove and the gas having a pressure forcing it through said groove.

6. An instrument having a reservoir and a bent bore and a gas by-pass along a portion of said bore and communicating therewith, a liquid in said reservoir and bore and having a capillary repulsion excluding it from said by-pass, gas in a portion of said bore and by-pass, and a circuit closing member connected with said bore.

7. An instrument containing a bore and a liquid having a volume variable by temperature changes to vary the quantity of liquid in said bore, means for facilitating the separation at a fixed point of quanta of liquid from the residue thereof in said bore, and a scale for measuring the separated quanta of liquid, the extent of the scale spanned by a separated quantum indicating the temperature at which a part of the residue will be at a predetermined fixed point along said bore.

8. A thermoregulator having a bore containing an electricity conducting liquid having a volume variable by temperature changes to vary the quantity of liquid in said bore, a control electrode in the path of liquid in said bore, means for facilitating the separation at a fixed point of quanta of liquid from the residue thereof in said bore, and a scale for measuring separated quanta of liquid, the extent of the scale spanned by a separated quantum indicating a temperature at which the residue will contact said control electrode.

9. A thermoregulator having a bore and containing an electricity conducting liquid having a volume variable by temperature changes to vary the quantity of liquid in said bore, means for facilitating the separation at a fixed point of quanta of liquid from the residue thereof in said bore, an electrode in the path of liquid in said bore, a graduated scale showing a temperature at which a residue of said liquid will engage said electrode after the removal from the liquid of a quantum thereof extending from such graduation to said electrode, and a second scale for measuring the separated quanta of liquid, the extent of the second scale spanned by a separated quantum indicating a temperature at which the residue of said liquid will contact said electrode.

10. A thermoregulator comprising a U-tube having a bulb adjacent to one end thereof and a spill-over receptacle adjacent to the other end thereof and a bore connecting said bulb and spill-over receptacle, said bulb containing a liquid having a volume variable by temperature changes to vary the quantity of liquid extruded from said bulb into said bore, means for facilitating the separation at a fixed point of quanta of liquid from the residue thereof in said bore and including a gas by-pass along said bore unenterable by said liquid, a control electrode in the path of liquid in said bore and a graduated scale showing the temperatures at which residues of said liquid will contact said electrode after the removal from the liquid of quanta thereof extending from such graduations to an end of said by-pass.

ALFRED TAUSCHER.